United States Patent
Keslin (10) Patent No.: US 8,427,491 B2
(45) Date of Patent: Apr. 23, 2013

(54) SYSTEM, METHOD, AND COMPUTER PROGRAM PRODUCT FOR REMOTE GRAPHICS PROCESSING

(75) Inventor: Phillip C. Keslin, San Jose, CA (US)

(73) Assignee: Silicon Graphics International Corp., Fremont, CA (US)

( * ) Notice: Subject to any disclaimer, the term of this patent is extended or adjusted under 35 U.S.C. 154(b) by 861 days.

(21) Appl. No.: 11/892,627

(22) Filed: Aug. 24, 2007

(65) Prior Publication Data

US 2008/0049030 A1     Feb. 28, 2008

Related U.S. Application Data

(63) Continuation of application No. 09/629,458, filed on Jul. 31, 2000, now Pat. No. 7,274,368.

(51) Int. Cl.
  *G06T 1/00*  (2006.01)
  *G06T 15/00* (2011.01)
  *G06F 3/00*  (2006.01)

(52) U.S. Cl.
  USPC ............ 345/522; 345/506; 715/733; 715/740

(58) Field of Classification Search .................. 345/506, 345/522; 715/733, 740
  See application file for complete search history.

(56) References Cited

U.S. PATENT DOCUMENTS

| | | |
|---|---|---|
| 4,805,134 A | 2/1989 | Calo et al. |
| 5,241,625 A * | 8/1993 | Epard et al. .................. 345/502 |
| 5,291,608 A | 3/1994 | Flurry |
| 5,408,600 A | 4/1995 | Garfinkel et al. |
| 5,485,570 A | 1/1996 | Busboom et al. |
| 5,583,922 A | 12/1996 | Davis et al. |
| 5,634,018 A | 5/1997 | Tanikoshi et al. |
| 5,664,206 A | 9/1997 | Murow et al. |
| 5,758,110 A | 5/1998 | Boss et al. |
| 5,799,150 A | 8/1998 | Hamilton et al. |
| 5,799,191 A | 8/1998 | Moriyasu et al. |

(Continued)

OTHER PUBLICATIONS

James E. Fowler; Evaluation of SGI Vizserver; NSF Engineering Research Center, Mississippi State University; [online], Mar. 31, 2000 [Retrieved on Jun. 6, 2005]. Retrieved Internet <URL: http://www.ece.msstate.edu/~fowler/Publications/Papers/Fow2000c.pdf>.

*Primary Examiner* — Ke Xiao
*Assistant Examiner* — Robert Craddock
(74) *Attorney, Agent, or Firm* — Morgan, Lewis & Bockius LLP (57) ABSTRACT

A system, method, and computer program product are provided for remote rendering of computer graphics. The system includes a graphics application program resident at a remote server. The graphics application is invoked by a user or process located at a client. The invoked graphics application proceeds to issue graphics instructions. The graphics instructions are received by a remote rendering control system. Given that the client and server differ with respect to graphics context and image processing capability, the remote rendering control system modifies the graphics instructions in order to accommodate these differences. The modified graphics instructions are sent to graphics rendering resources, which produce one or more rendered images. Data representing the rendered images is written to one or more frame buffers. The remote rendering control system then reads this image data from the frame buffers. The image data is transmitted to the client for display or processing. In an embodiment of the system, the image data is compressed before being transmitted to the client. In such an embodiment, the steps of rendering, compression, and transmission can be performed asynchronously in a pipelined manner.

14 Claims, 12 Drawing Sheets

U.S. PATENT DOCUMENTS

| | | | |
|---|---|---|---|
| 5,805,846 A | 9/1998 | Nakajima et al. | |
| 5,819,077 A | 10/1998 | Koga et al. | |
| 5,828,372 A | 10/1998 | Kameda | |
| 5,889,942 A | 3/1999 | Orenshteyn | |
| 5,946,487 A * | 8/1999 | Dangelo | 717/148 |
| 5,993,001 A | 11/1999 | Bursell et al. | |
| 6,032,119 A | 2/2000 | Brown et al. | |
| 6,047,314 A | 4/2000 | Pommier et al. | |
| 6,081,623 A | 6/2000 | Bloomfield et al. | |
| 6,085,227 A | 7/2000 | Edlund et al. | |
| 6,085,247 A | 7/2000 | Parsons et al. | |
| 6,088,702 A | 7/2000 | Plantz et al. | |
| 6,101,536 A | 8/2000 | Kotani et al. | |
| 6,115,038 A | 9/2000 | Christofferson et al. | |
| 6,118,899 A | 9/2000 | Bloomfield et al. | |
| 6,138,148 A | 10/2000 | Lipkin | |
| 6,145,001 A | 11/2000 | Scholl et al. | |
| 6,163,795 A | 12/2000 | Kikinis | |
| 6,166,734 A | 12/2000 | Nahi et al. | |
| 6,195,091 B1 | 2/2001 | Harple et al. | |
| 6,205,716 B1 | 3/2001 | Peltz | |
| 6,215,498 B1 | 4/2001 | Filo et al. | |
| 6,219,057 B1 | 4/2001 | Carey et al. | |
| 6,222,551 B1 * | 4/2001 | Schneider et al. | 345/419 |
| 6,249,294 B1 | 6/2001 | Lefebvre et al. | |
| 6,285,363 B1 | 9/2001 | Mairs et al. | |
| 6,330,594 B1 | 12/2001 | Swart | |
| 6,373,489 B1 | 4/2002 | Lu et al. | |
| 6,377,266 B1 | 4/2002 | Baldwin | |
| 6,424,342 B1 | 7/2002 | Perlman et al. | |
| 6,446,192 B1 | 9/2002 | Narasimhan et al. | |
| 6,463,457 B1 | 10/2002 | Armentrout et al. | |
| 6,535,909 B1 | 3/2003 | Rust | |
| 6,564,250 B1 | 5/2003 | Nguyen | |
| 6,802,053 B1 | 10/2004 | Dye et al. | |
| 6,834,306 B1 | 12/2004 | Tsimelzon | |
| 6,925,608 B1 | 8/2005 | Neale et al. | |
| 7,274,368 B1 | 9/2007 | Keslin | |
| 2001/0039487 A1 | 11/2001 | Hammersley et al. | |
| 2002/0015042 A1 | 2/2002 | Robotham et al. | |
| 2002/0046262 A1 | 4/2002 | Heilig et al. | |
| 2002/0063715 A1 | 5/2002 | Foran | |
| 2004/0158812 A1 | 8/2004 | Dye et al. | |

* cited by examiner

FIG. 12

SYSTEM, METHOD, AND COMPUTER PROGRAM PRODUCT FOR REMOTE GRAPHICS PROCESSING

CROSS-REFERENCE TO RELATED APPLICATIONS

This application is a continuation of U.S. patent application Ser. No. 09/629,458, filed Jul. 31, 2000, issued as U.S. Pat. No. 7,274,368 on Sep. 25, 2007, which is incorporated herein in its entirety by reference.

BACKGROUND OF THE INVENTION

1. Field of the Invention

The present invention relates to computer graphics, and more particularly to graphics computing architecture.

2. Related Art

Today a user of a graphics processing host, such as an INFINITE REALITY system by Silicon Graphics, Inc. of Mountain View, Calif., runs a graphics application locally. Rendering in response to the graphics instructions is also performed locally. The distance from the host to a user can be extended to a distance of, for example, one to three kilometers by the use of fiberoptic cables to connect the user's monitor and keyboard with the graphics processing host. More important, the host is the dedicated resource of a single person. It can only be shared if someone else takes the place of the current user. While a dedicated resource is convenient for the user, it may not be economical. The cost of a graphics processing host is considerable; less than full usage of such a host lowers its cost-effectiveness. This lower cost-effectiveness could deter an organization from procuring a graphics processing host.

Hence there is a need for a system and method by which additional users can utilize a remote graphics processing host. This would improve the cost-effectiveness of the host. Specifically, a system and method are needed where a user can execute a graphics application at a remote graphics processing host, causing rendering to be performed at the host such that the resulting images are returned to the user.

SUMMARY OF THE INVENTION

The invention described herein is a system, method, and computer program product for remote rendering of computer graphics. The invention includes a graphics application program resident at a remote server. The graphics application is invoked by a user or process located at a client. At the server, the invoked graphics application proceeds to issue graphics instructions. The graphics instructions are received by a remote rendering control system. Given that the client and server differ with respect to graphics context and image processing capability, the remote rendering control system modifies the graphics instructions in order to accommodate these differences. The modified graphics instructions are sent to graphics rendering resources, which produce one or more rendered images. Data representing the rendered images is written to one or more frame buffers. The remote rendering control system then reads this image data from the frame buffers. The image data is transmitted to the client for display or processing. In an embodiment of the invention, the image data is compressed before being transmitted to the client. In such an embodiment, the steps of rendering, compression, and transmission can be performed asynchronously in a pipelined manner.

FEATURES AND ADVANTAGES

The invention described herein has the feature of allowing a user to invoke a graphics application at a remote server. The invention also has the feature of allowing the graphics application to send graphics instructions to graphics rendering resources located with the server, so that rendering is performed at the host and not at the user's machine. The invention also has the feature of returning rendered image data to the user.

The invention has the advantage of allowing a user to utilize graphics resources that are not co-located with the user, but are instead located at a distance from the user. The invention also has the advantage of allowing greater utilization of graphics resources, since users other than local users can take advantage of graphics resources.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Contents I. Introduction
II. Apparatus
III. Method
   A. Server processing
      1. Initialization
         a. Client/server handshake
         b. Client window
         c. Graphics context
         d. Context and server window
      2. Client parameters
      3. Rendering and transmission
   B. Client processing
IV. Environment
V. Conclusion

I. INTRODUCTION

The invention described herein is a system, method, and computer program product for remote rendering of computer graphics. The invention allows a user or process at a client computer to access remotely located rendering resources, such as a graphics processing host embodied in or co-located with a remotely located server. According to the invention, a graphics application executing at the server sends graphics instructions to a remote rendering control system. The remote rendering control system can be embodied in software running on the server. The instructions sent from the application are not sent to the client. Hence the client does no rendering. The instructions are modified by the remote rendering control system and sent to graphics rendering resources. Rendering consequently takes place at the graphics resources. The image data that is produced by the graphics resources are then sent to the client.

II. APPARATUS

Figure 1:
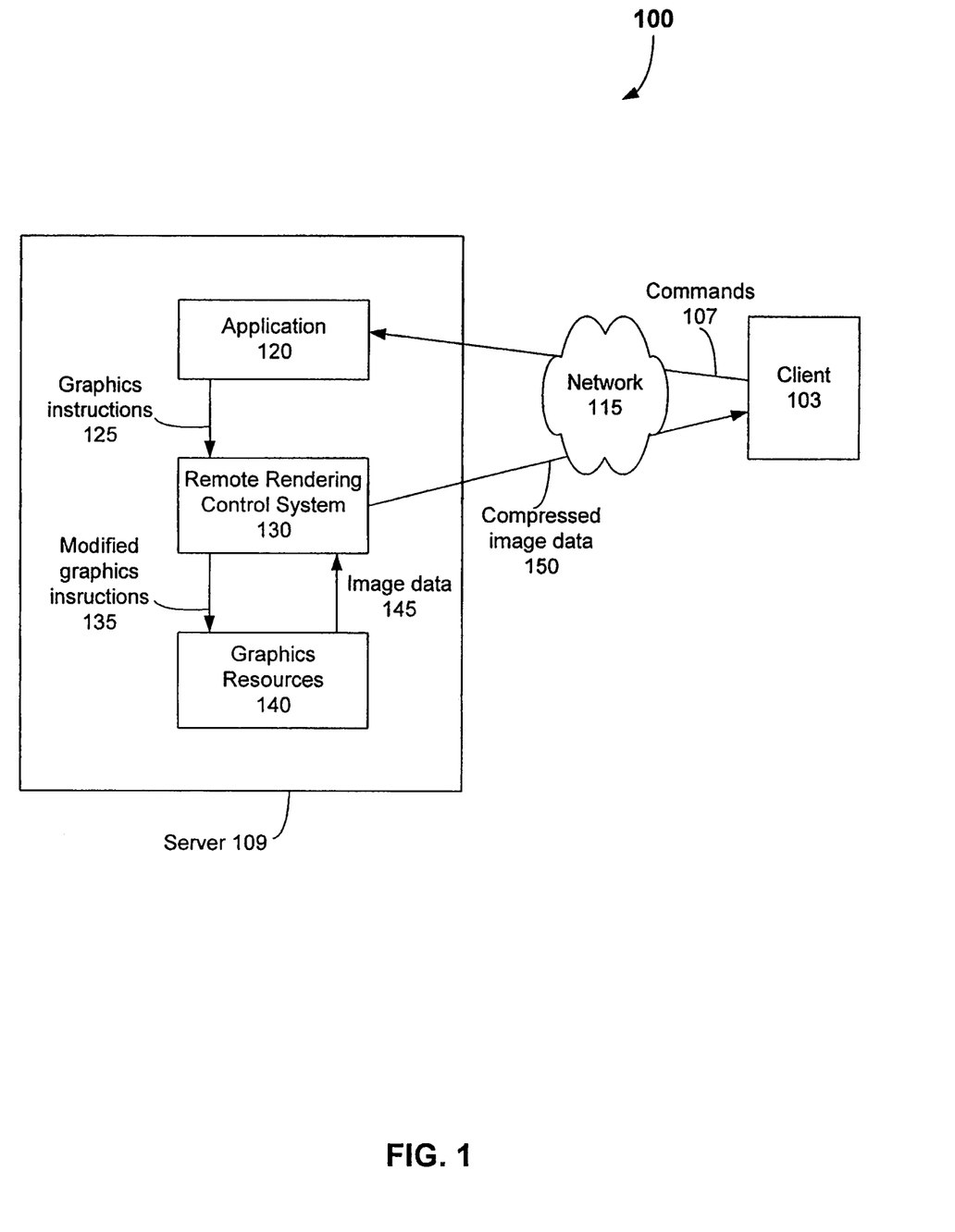
FIG. 1 illustrates the overall architecture of an embodiment of the invention.

The basic architecture of an embodiment of the present invention is illustrated in FIG. 1. A user or process at a client machine 103 wishes to have rendering performed remotely. Accordingly, client 103 issues commands 107 to a remotely located server 109. In an embodiment of the invention, connectivity between client 103 and server 109 is established and maintained through a communications network 115, such as the internet. Commands 107 are received at server 109 by a graphics application 120. In response to commands 107, application 120 generates graphics instructions 125. Graphics instructions may, for example, be in the OPENGL language.

Graphics instructions 125 are sent to a remote rendering control system 130. Remote rendering control system 130 accepts graphics instructions 125 and modifies them to create modified graphics instructions 135. An example of a remote rendering control system is the VIZSERVER software system produced by Silicon Graphics, Inc. As will described in greater detail below, the modifications to graphics instructions 125 are performed to take into account the differences between server 109 and client 103 with respect to their imaging processing capabilities and graphics contexts. In response to modified graphics instructions 135, graphics resources 140 render one or more images and return image data 145 to remote rendering control system 130. In an embodiment of the invention, image data 145 is then compressed to form compressed image data 150. Compressed image data 150 is then sent to client 103, via network 115. In alternative embodiments of the invention, compression is not implemented.

Figure 2:
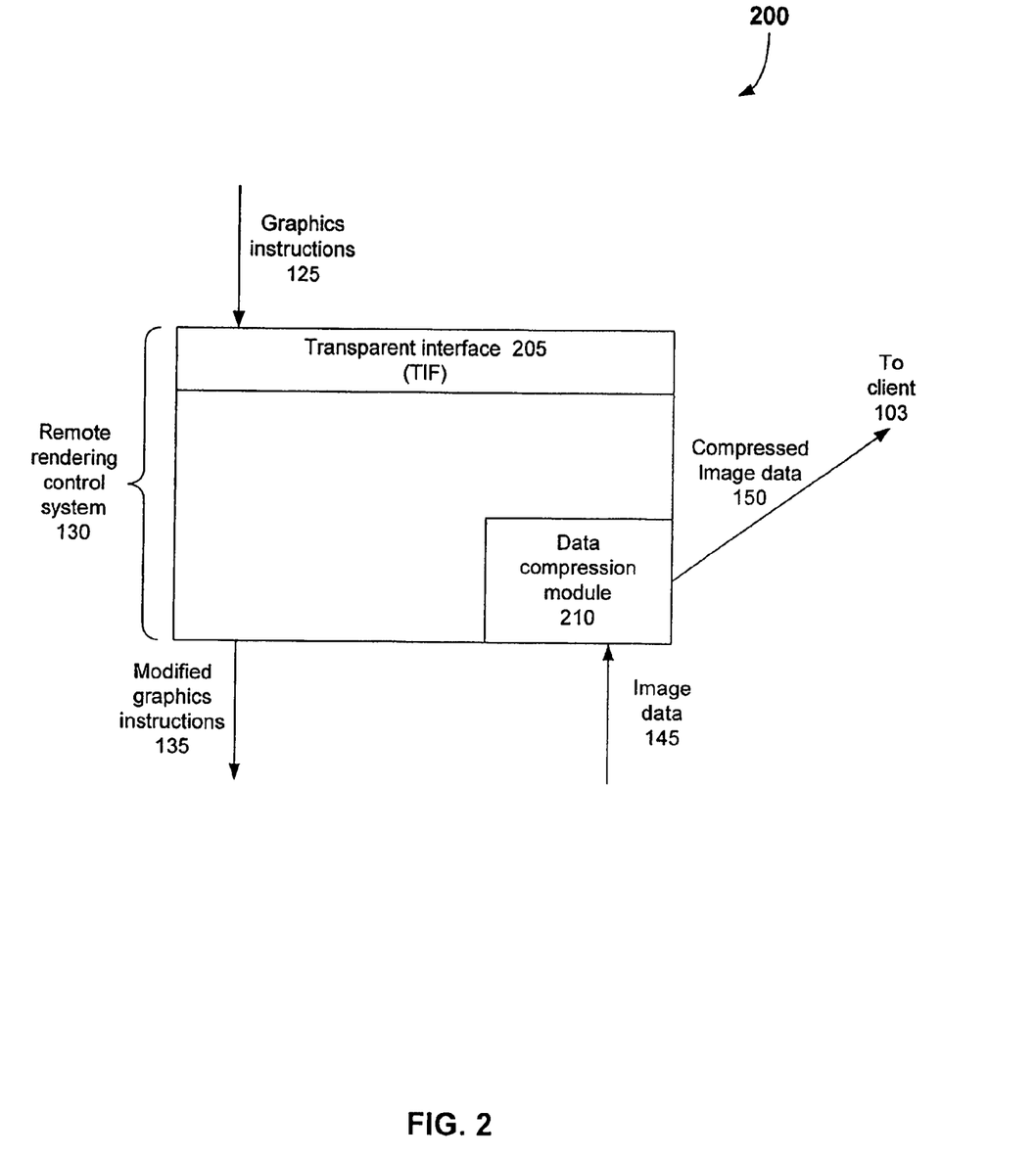
FIG. 2 is a block diagram of the remote rendering control system, according to an embodiment of the invention.

A more detailed logical illustration of remote rendering control system 130 is shown in FIG. 2. Remote rendering control system 130 accepts graphics instructions 125 through an interface 205 which is transparent to the graphics application 120. Graphics application 120 is effectively sending graphics instructions to local rendering resources instead of to client 103. Because of the transparency of interface 205, graphics application 120 need not be aware of this redirection. Transparent interface 205 performs a variety of modifications to graphics instructions 125, to produce modified graphics instructions 135. The modifications performed by transparent interface 205 will be described in greater detail below. Modified graphics instructions 135 are then sent to graphics resources 140 (not shown in FIG. 2) to effect rendering.

After rendering has been performed, remote rendering control system 130 accepts the resulting image data 145. As described above, in an embodiment of the invention, image data 145 undergoes compression before transmission to client 103. Compression of the data is performed by a data compression module 210, which produces compressed image data 150. Various methods of data compression are known to persons of ordinary skill in the art. In an embodiment of the invention, color cell compression is used. In alternative embodiments of the invention, data compression module 210 can perform alternative compression algorithms, such as the process described in U.S. patent application Ser. No. 09/458,011, "Image Data Compression and Decompression," filed Dec. 10, 1999, issued as U.S. Pat. No. 6,683,979 on Jan. 27, 2004, incorporated herein by reference in its entirety. In an embodiment of the invention, data compression module 210 is capable of performing any of a plurality of data compression algorithms.

III. METHOD

Figure 3:
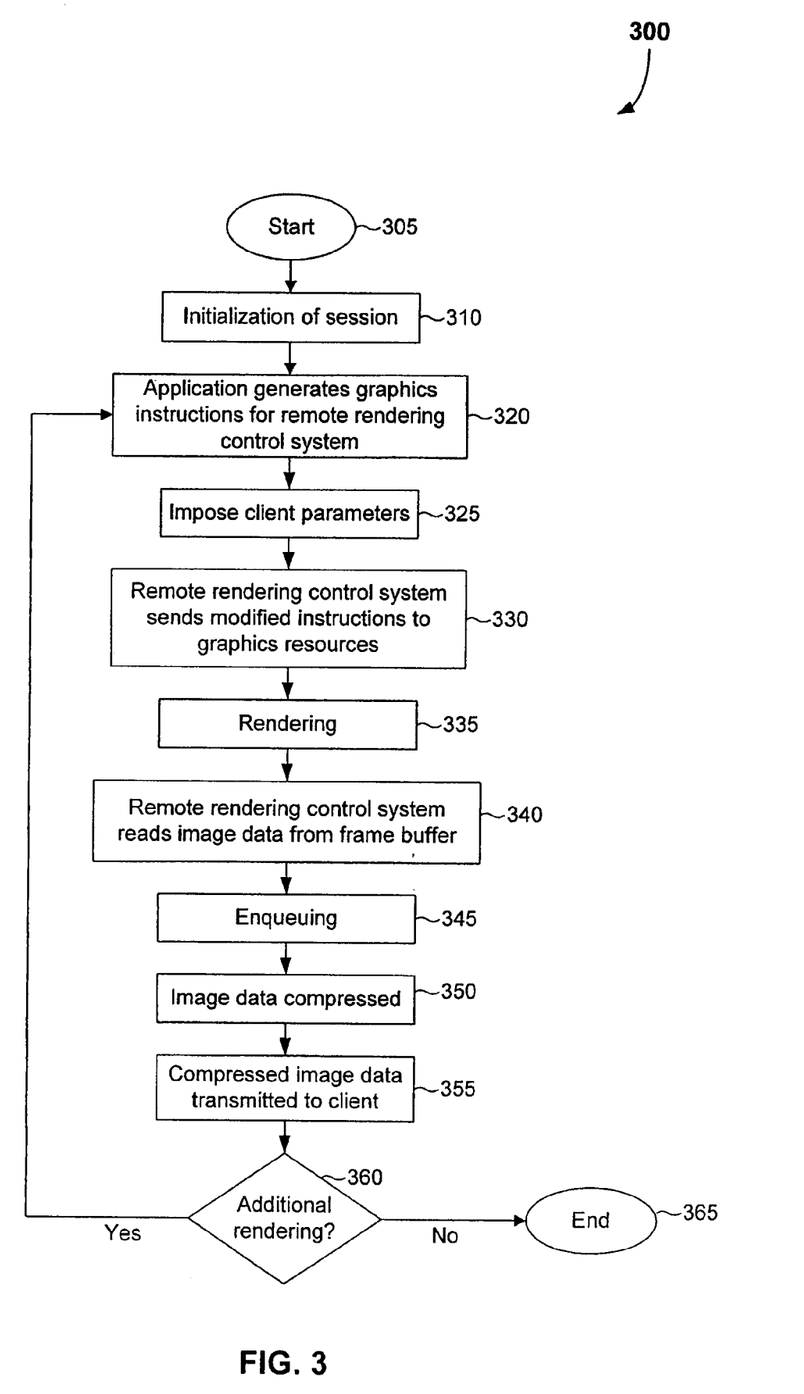
FIG. 3 is a flowchart illustrating the method of the invention, according to an embodiment thereof.

The overall process of an embodiment of the invention is illustrated in FIG. 3. Process 300 starts at step 305. At step 310, a graphics session between a client and a remote server is initialized. Initialization step 310 includes the client=s initial access to and protocol "handshake" with the server. In addition, step 310 includes the starting of the graphics application. Step 310 also includes reconciling the differences between the client and server with respect to graphics processing capability and graphics context. Such reconciliation is necessary to allow processing of an image at the server and display (or further processing) of the image at the client. Initialization will be described in greater detail below.

In step 320, the graphics application generates graphics instructions for the remote rendering control system. In step 325, parameters specific to the client are imposed. This step includes, for example, interception by the transparent interface of function calls and references that occur in the graphics instructions, and the modification of those function calls and references to make them suitable to the client. In particular, adjustments may have to be made given that the client and server can have different graphics processing capabilities and contexts. Step 325 is described in greater detail below.

In step 330, the remote rendering control system sends modified graphics instructions to the graphics resources. The modified instructions of this step correspond to the graphics instructions generated in step 320 and modified in step 325. In step 335, the graphics resources render one or more images according to the modified instructions of step 330.

In step 340, after rendering is completed, the remote rendering control system reads the resulting image data from a frame buffer. In an embodiment of the invention, the graphics application can have one or more specific instructions that force the reading of the frame buffer. If, for example, OPENGL is being used, the instruction "glflush" causes the frame buffer to be "flushed," i.e., read. The OPENGL instruction "glswapbuffers" also serves this purpose where two frame buffers are used. Here, the buffers will be swapped. A first buffer, to which image data has most recently been written, will be read. Writing, meanwhile, now takes place into the second buffer. Likewise, at the next "glswapbuffers" instruction, the second buffer will be read and the first buffer will begin receiving new image data.

In step 345, the image data is enqueued for purposes of compression. In step 350, the image data is compressed so that in step 355 the image data can be transmitted to the client efficiently. In step 360, a determination is made as to whether additional rendering is necessary. If so, the process returns to step 320. If no additional rendering is required in step 360, the process concludes at step 365.

A. Server Processing

1. Initialization

Figure 4:
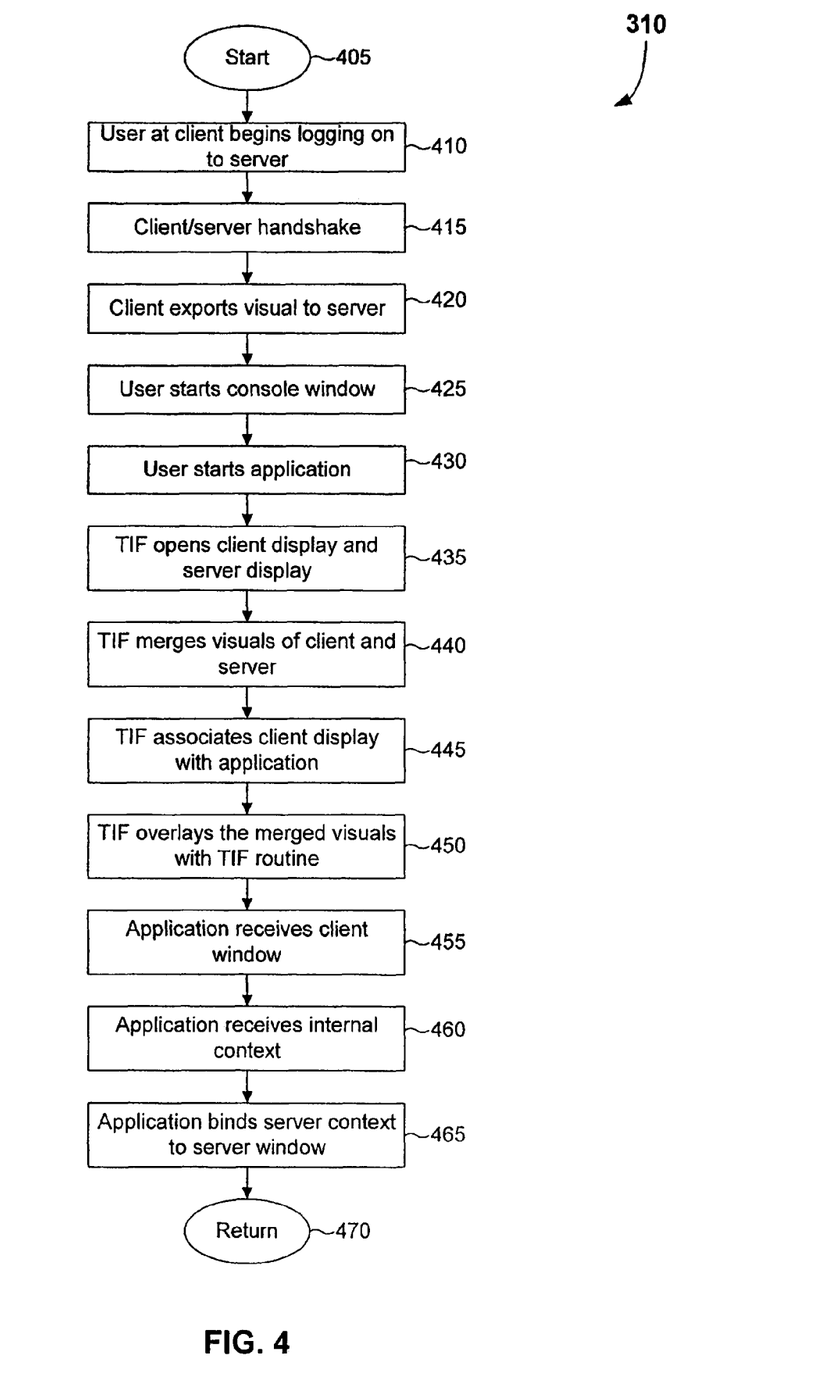
FIG. 4 is a flowchart illustrating the step of initialization, according to an embodiment of the invention.

The initialization step 310, according to an embodiment of the invention, is illustrated in greater detail in FIG. 4. The process begins at step 405. In step 410, a user or process at the client machine, begins logging on to the server. As a result, in step 415 a client/server handshake takes place. The handshake includes the initial contact and protocol establishment between the server and client. Step 415 also includes an agreement process between the client and server as to which data compression algorithm will be used, if there are more than one available. The client/server handshake process is described in greater detail below with respect to FIG. 5. In step 420, the client exports to the server a list of the client's graphics capabilities. A list of specific graphics capabilities is known as a visual. Examples of capabilities that may be included in a visual are the ability to perform stenciling or represent opacity. Another component of a visual is the color mapping range of a device, e.g., 48-bit versus 24-bit color representation.

In step 425, the user or process starts a console window at the client computer. In step 430, the user or process starts the graphics application resident at the server. In step 435, the transparent interface to the graphics application opens the client display and the server display. In step 440, the transparent interface merges the visual of the client with the visual of the server. Because a graphics application typically deals with a single output device, the graphics application must see a single visual. This merger allows the graphics application to see a single visual, while in reality presenting visuals for both client and server. In step 445, the transparent interface associates the client display with the graphics application. In step 450, the transparent interface overlays the server visual with a routine that allows conversion of visual capabilities appearing in function calls of the graphics application. The routine converts these visual capabilities to capabilities appropriate to the client, i.e., capabilities in the client's original visual. The development and application of such a routine would be obvious to one of ordinary skill in the art given this description.

In step 455, the client window is returned to the graphics application. This step includes the conversion, by the transparent interface, of the merged visual list into a visual appropriate to the client. Step 455 also includes creation of an internal data structure for tracking the position of the client window in the client display. The process of receiving the client window is described in greater detail below with respect to FIG. 6.

In step 460, the application receives a graphics context. This step, detailed below with respect to FIG. 7, includes definition of a server context by the transparent interface. Step 460 also includes the return of an internal context to the application. In step 465, the application binds the internal context to the client window, which has the effect of binding the server context to the server window. The initialization process concludes with step 470.

a. Client/Server Handshake

Figure 5:
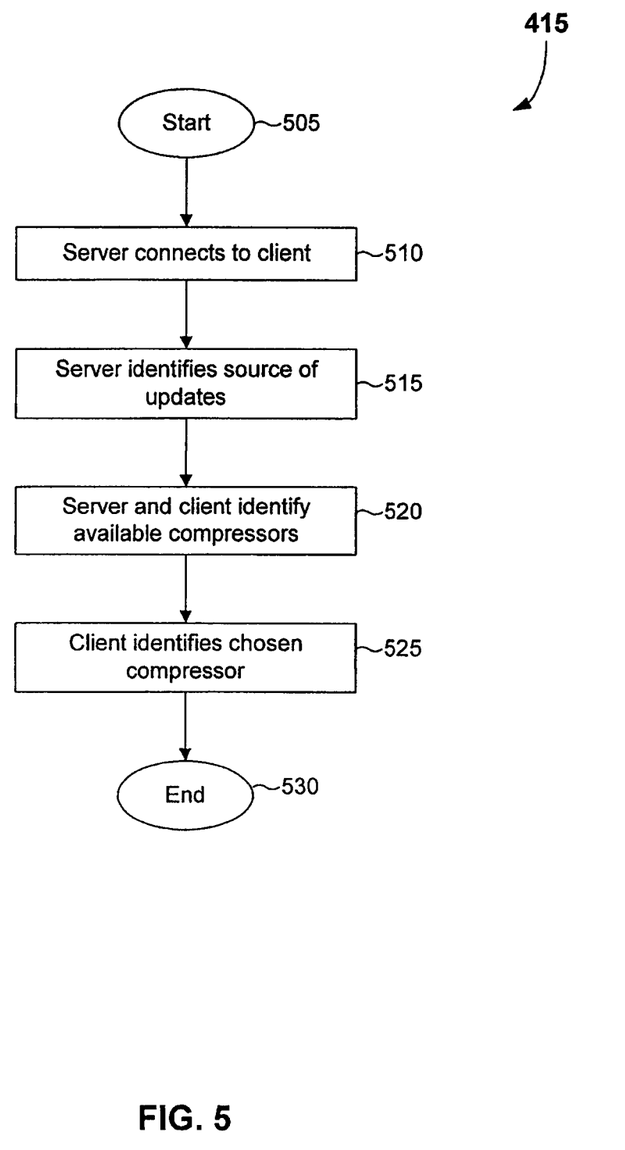
FIG. 5 is a flowchart illustrating the client/server handshake, according to an embodiment of the invention.

An embodiment of the client/server handshake, step 415, is illustrated in greater detail in FIG. 5. This process begins with step 505. In step 510, the server connects to the client. In step 515, the server (in particular, the application) identifies an address or source from which updates of image data are provided. It is from this source that updates will be sent to the client. In step 520, the server and client identify their respective available compression algorithms to each other. In step 525, the client chooses a compression algorithm and identifies it to the server. The process concludes with step 530.

b. Client Window

Figure 6:
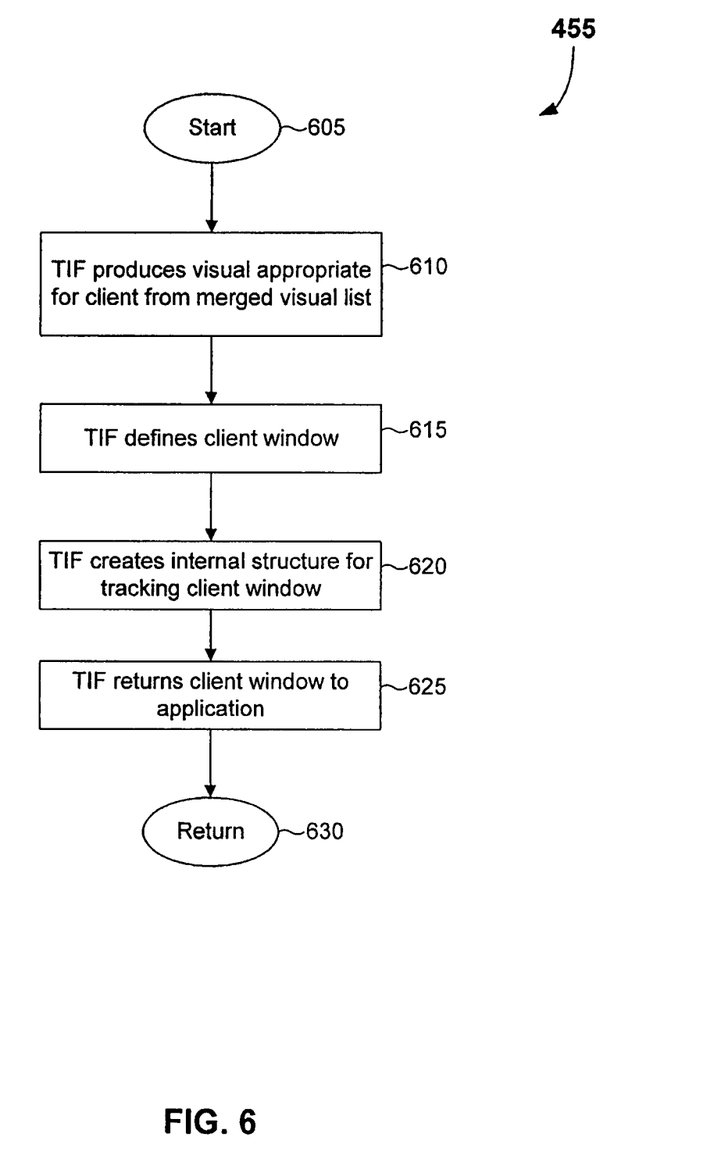
FIG. 6 is a flowchart illustrating the graphics application=s receipt of a client window, according to an embodiment of the invention.

The step by which a client window is returned to the application, step 455, is illustrated in greater detail in FIG. 6, according to an embodiment of the invention. The process begins with step 605. In step 610, the transparent interface produces a visual appropriate for the client from the merged visual list. This is done by taking only those visual capabilities which were originally the client's. Definition of such a visual is required for an image to be displayed properly at the client. In step 615, the transparent interface defines a window for the client. In step 620, the transparent interface creates an internal data structure for tracking the position of the client window on the client display. In step 625, the transparent interface returns the client window to the application. The process concludes with step 630.

c. Graphics Context

Figure 7:
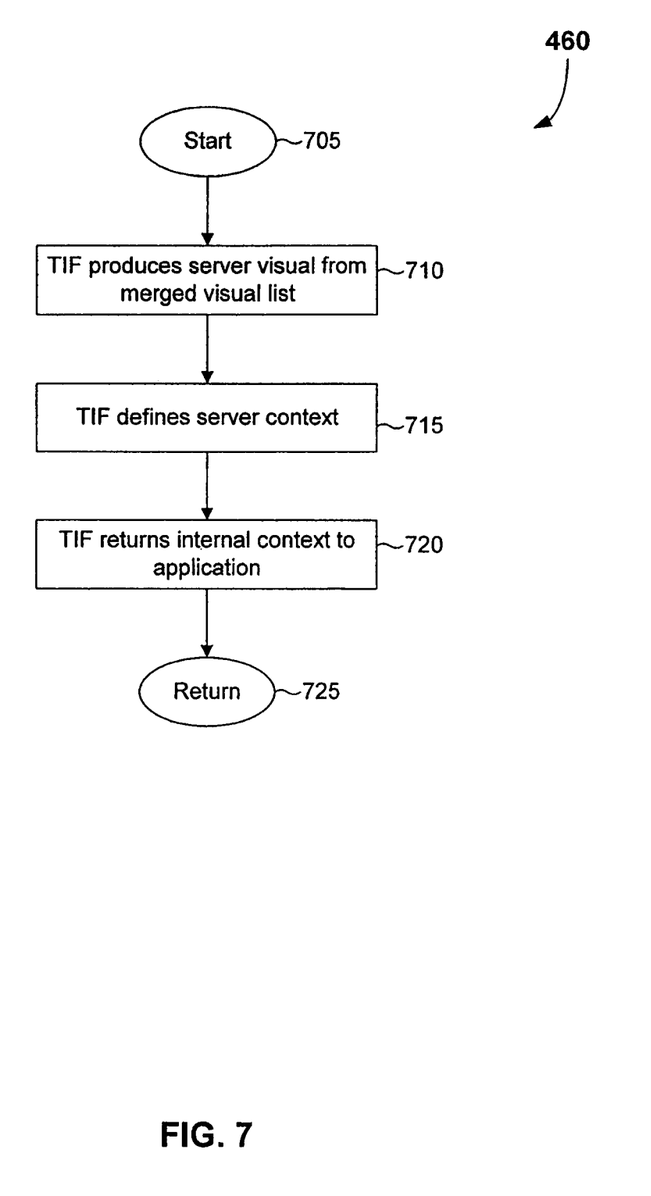
FIG. 7 is a flowchart illustrating the graphics application=s receipt of a graphics context, according to an embodiment of the invention.

An embodiment of the process by which a graphics context is returned to the application, step 460, is illustrated in greater detail in FIG. 7. The process begins with step 705. In step 710, the transparent interface produces a server visual from the merged visual. This is done by taking only those visual capabilities which were originally the server's. In step 715, the transparent interface defines a server context. The server context represents the context settings to be applied in rendering for the server's display. In step 720, the transparent interface returns an internal context to the application program, where the internal context includes the server context and any additional information that may be necessary to allow the transparent interface to properly interpret references to the server context. An example of such additional information is the identity of specific visual capabilities that correspond to a given element of the server context. The process concludes with step 725.

d. Context and Server Window

Figure 8:
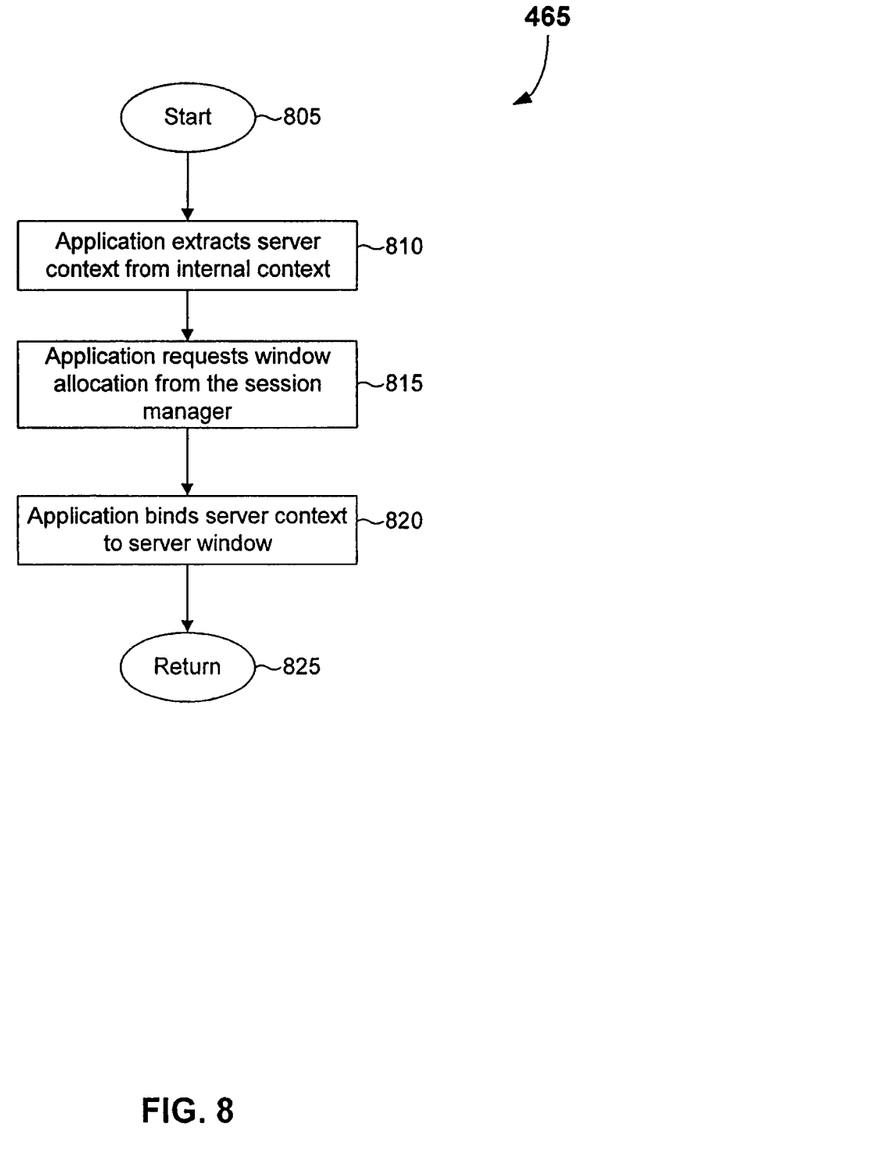
FIG. 8 is a flowchart illustrating the binding of a server context to a server window, according to an embodiment of the invention.

The step of binding a context to a server window, step 465, is illustrated in greater detail in FIG. 8, according to an embodiment of the invention. The process begins with step 805. In step 810, the transparent interface extracts the server context from the internal context. In step 815, the transparent interface requests a window allocation from the session manager. The session manager is logic (e.g., software) responsible for managing the allocation of resources in a graphics session. The implementation of a session manager is known to persons of ordinary skill in the art. In step 820, the transparent interface binds the server context to the server window. The process concludes with step 825.

2. Client Parameters

Figure 9:
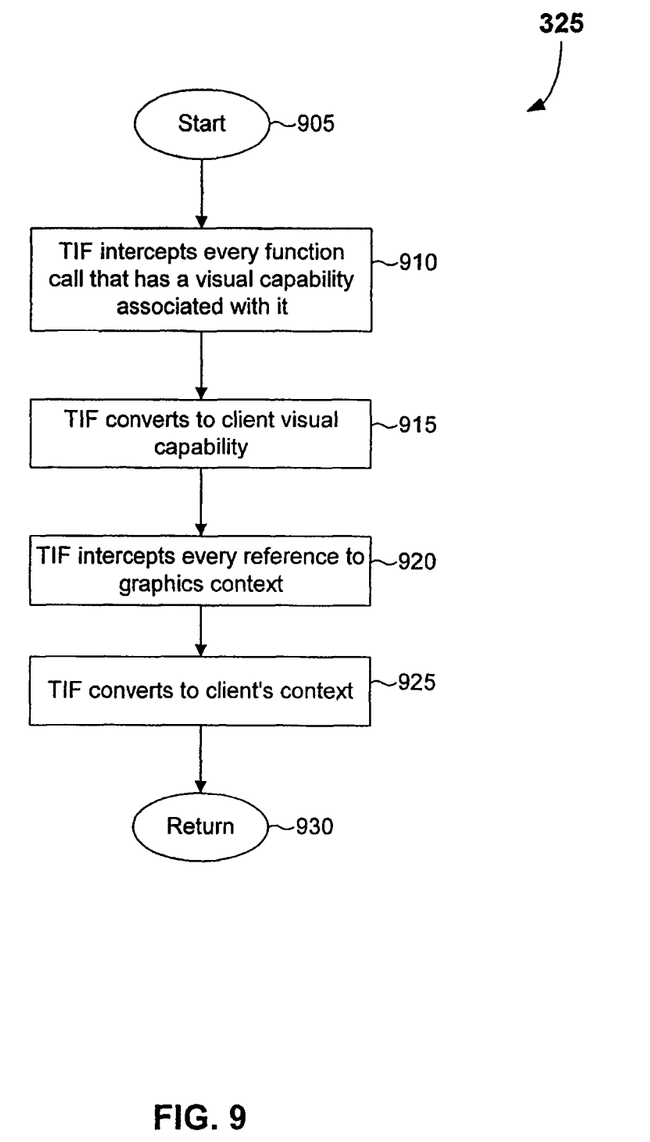
FIG. 9 is a flowchart illustrating the step of imposing client parameters on the rendering process, according to an embodiment of the invention.

Returning to the overall process 300 illustrated in FIG. 3, once initialization is completed in step 310, the graphics application generates graphics instructions in step 320, as discussed above. This is followed by step 325, the step of imposing client parameters on the rendering process. An embodiment of step 325 is illustrated in greater detail in FIG. 9. The process begins with step 905. In step 910, the transparent interface intercepts graphics instruction function calls that include a visual. In step 915, the transparent interface converts the visuals to corresponding client visuals. In step 920, the transparent interface intercepts every graphics instruction reference to a context. In step 925 the transparent interface converts the reference to a reference consistent with the client's context. The process concludes at step 930.

3. Rendering and Transmission

Figure 10:
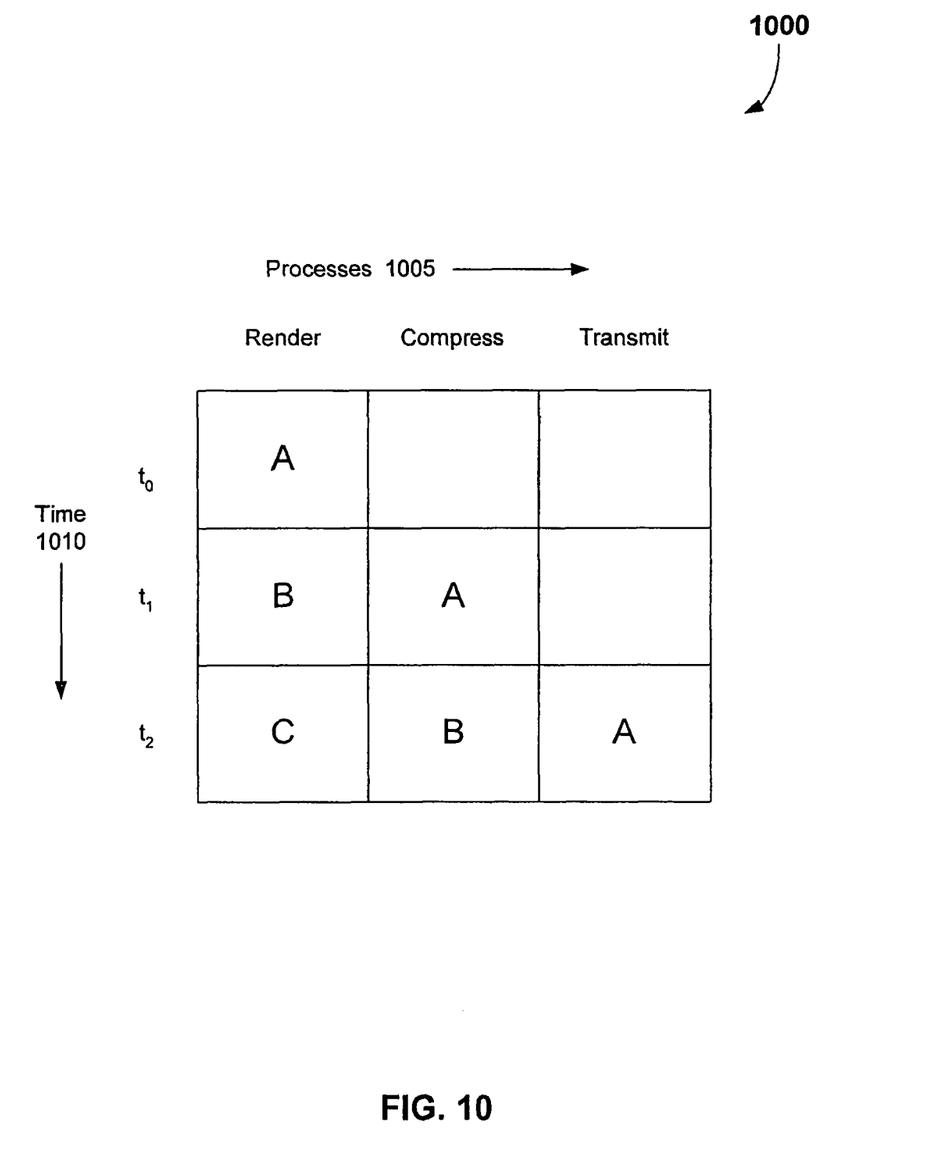
FIG. 10 illustrates the pipelining of the rendering, compression, and transmission operations, according to an embodiment of the invention.

Steps 340 through 355 (rendering, enqueuing, compression, and transmission) are collectively illustrated in FIG. 10, according to an embodiment of the invention. This figure illustrates how blocks of image data are rendered, compressed, then transmitted. In the illustrated embodiment, these operations are performed in pipeline fashion. The rendering, compression, and transmission steps are identified collectively as processes 1005. These steps take place sequentially during successive blocks of time 1010. During time to, a block A of image data is rendered. During the next interval, time $t_1$, block A is compressed. Simultaneously, the next segment of image data, block B, is rendered. At the next time interval, $t_2$, block A is transmitted after having been compressed during the previous time period. While block A is being transmitted, block B is compressed. Simultaneously, the next block of image data, block C, is being rendered. Successive blocks of image data are processed in this manner.

In an embodiment of the invention, the steps of rendering, compression, and transmission are asynchronous. In such an embodiment, the compression of block B may not be completed at the same time as the rendering of block C, referring to the example above. To deal with this, blocks of image data may be discarded. Any given step will take only the most recent block from the previous step. If, for example, rendering of block B takes place faster than the compression of block A, the compression module is not yet ready for block B when rendering of block B is done. Block B will therefore be discarded. The compression module will finish compressing block A, then wait for the next (and newest) block to emerge from rendering. Multiple blocks may be discarded if rendering is significantly faster than compression. The transmission process will likewise accept only the newest compressed block of image data. If compression of a block is completed before the previous block has been transmitted, that compressed block will be discarded.

B. Client Processing

Figure 11:
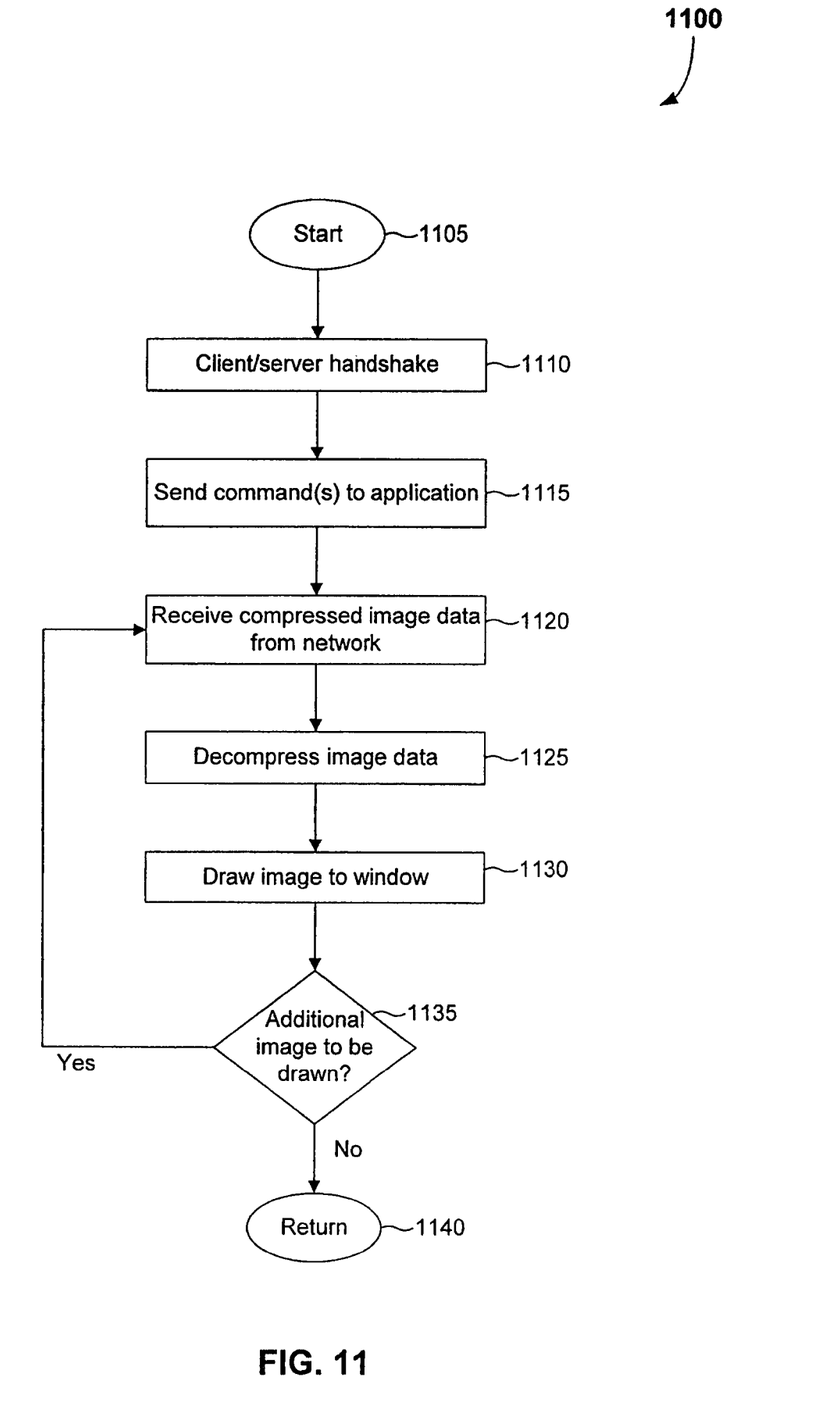
FIG. 11 is a flowchart illustrating the remote rendering process from the perspective of the client, according to an embodiment of the invention.

An embodiment of the remote rendering process from the perspective of the client is illustrated in FIG. 11. The process starts with step 1105. In step 1110, the client/server handshake takes place, as described above. In step 1115, the client sends one or more commands to the graphics application to begin execution. In step 1120, after the graphics resources at the server have completed rendering, the client receives image data via the network. In an embodiment of the invention, the image data is compressed for purposes of transmission efficiency. In step 1125, the image data is decompressed at the client and in step 1130, the appropriate image is drawn to a window at the client. In step 1135 a determination is made as to whether an additional image is to be drawn. If so, the process continues at step 1120. Otherwise the process concludes at step 1140.

IV. ENVIRONMENT

Figure 12:
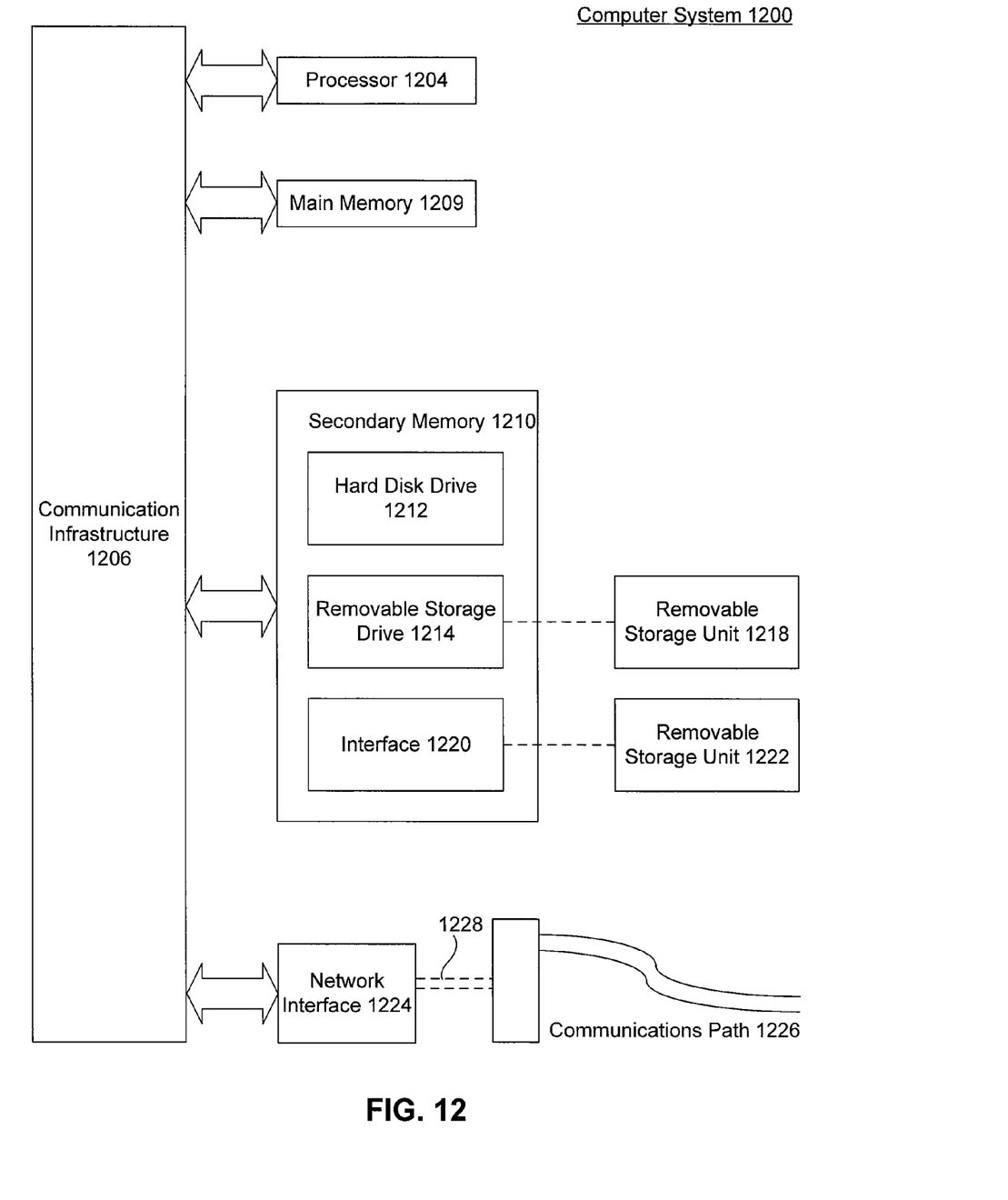
FIG. 12 illustrates the computing environment of the invention, according to an embodiment thereof.

Server 109 of the present invention may be implemented as a computer system or other processing system. Remote rendering control system 130 and graphics application program 120 can be implemented as computer programs executing on such a computer system. Graphics resources 140 can be any type of graphics subsystem linked to a communication infrastructure 1206, such as a bus or network. An example of such a computer system 1200 is shown in FIG. 12. The computer system 1200 includes one or more processors, such as processor 1204. The processor 1204 is connected to communication infrastructure 1206. Various software implementations are described in terms of this exemplary computer system. After reading this description, it will become apparent to a person skilled in the relevant art how to implement the invention using other computer systems and/or computer architectures.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, or other storage medium which is read by and written to by removable storage drive 1214. As will be appreciated, the removable storage unit 1218 includes a computer usable storage medium having stored therein computer software and/or data.

In alternative implementations, secondary memory 1210 may include other means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCM-CIA slot and card, etc. Software and data transferred via communications interface 1224 are in the form of signals 1228 which may be electronic, electromagnetic, optical or other signals capable of being received by communications interface 1224. Commands 107 and compressed image data 150 are examples of signals 1228. These signals 1228 are provided to communications interface 1224 via a communications path (i.e., channel) 1226. This channel 1226 carries signals 1228 and may be implemented using wire or cable, fiber optics, a phone line, a cellular phone link, an RF link and other communications channels.

In this document, the terms "computer program medium" and "computer usable medium" are used to generally refer to media such as removable storage units 1218 and 1222, a hard disk installed in hard disk drive 1212, and signals 1228. These computer program products are means for providing software to computer system 1200.

Computer programs (also called computer control logic) are stored in main memory 1208 and/or secondary memory 1210. Computer programs may also be received via communications interface 1224. Remote rendering control system 130 and graphics application program 120 can be implemented as computer programs. Such computer programs, when executed, enable the computer system 1200 to implement the present invention as discussed herein. In particular, the computer programs, when executed, enable the processor 1204 to implement the present invention. Accordingly, such computer programs represent controllers of the computer system 1200. Where the invention is implemented using software, the software may be stored in a computer program product and loaded into computer system 1200 using removable storage drive 1214, hard drive 1212 or communications interface 1224.

V. CONCLUSION

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A system comprising:
    a server system comprising one or more processors and memory storing one or more programs executable by the one or more processors, the one or more programs including instructions for:
        receiving, at a graphics application, a command from a client, the command related to a graphics rendering operation performed by the graphics application, and, responsive to the command, generating an application programming interface call for producing rendered image data;
        receiving, at a remote rendering control system, the application programming interface call from the graphics application and modifying one or more parameters of the application programming interface call based upon one or more differences between the client and the server in at least one of graphics processing capabilities and graphics contexts;
        performing, with a rendering process, the rendering operation using the modified parameters; and
        transmitting, with a transmission process, the rendered image data to the client for display without rendering the image data on the client;
    wherein the remote rendering control system compresses, by a compression process, the image data and wherein the rendering process of a first block of data occurs during a first time period, the compression process of a second block of data occurs during a second time period, and the transmission process of a third block of data occurs during a third time period so that the rendering process, the compression process, and the transmission process are pipelined; and
    wherein the remote rendering control system discards the first block of data if the rendering process of the first block of data is completed before the compression process of the second block of data and discards the second block of data if the compression process of the second block of data is completed before the transmission process of the third block of data.

2. The system of claim 1, wherein the application programming interface is an OPENGL application programming interface.

3. The system of claim 1, wherein the remote rendering control system converts the at least one of the graphics processing capabilities and the graphics contexts appearing in the application programming interface call from the at least one of the graphics processing capabilities and the graphics contexts of the server to the at least one of the imaging processing capabilities and the graphics contexts of the client to generate the modified application programming interface call based upon the differences, between the client and the server, in the at least one of the graphics processing capabilities and the graphic contexts.

4. The system of claim 1, wherein the remote rendering control system further modifies the application programming interface call by modifying function calls and references in the application programming interface call to make them suitable to the client.

5. The system of claim 4, wherein the remote rendering control system is further intercepts the function calls and references in the application programming interface call.

6. A method for rendering image data, performed at an electronic device having one or more processors and memory storing one or more programs executable by the one or more processors, the method comprising:
    receiving, at a server, a command from a client, the command related to a graphics rendering operation performed by the graphics application;
    generating, at the server and in response to the command, an application programming interface call for producing rendered image data;
    modifying, at the server, one or more parameters of the application programming interface call based upon one or more differences between the client and the server in at least one of graphics processing capabilities and graphics contexts;
    performing with a rendering operation using the modified parameters;
    transmitting, with a transmission process, the rendered image data to the client for display without rendering the image data on the client;
    compressing, by a compression process at the server, the image data, wherein the rendering process of a first block of data occurs during a first time period, the compression of a second block of data occurs during a second time period, and the transmission process of a third block of data occurs during a third time period so that the rendering process, the compression process, and the transmission process are pipelined;
    discarding, at the server, the first block of data if the rendering process of the first block of data is completed before the compression process of the second block of data; and
    discarding, at the server, the second block of data if the compression process of the second block of data is completed before the transmission process of the third block of data.

7. The method of claim 6, wherein modifying the one or more parameters of the application programming interface call comprises converting the at least one of the graphics processing capabilities and the graphics contexts appearing in the application programming interface call from the at least one of the graphics processing capabilities and the graphics contexts of the server to the at least one of the graphics processing capabilities and the graphics contexts of the client.

8. The method of claim 6, wherein modifying the application programming interface call further includes modifying function calls and references in the application programming interface call to make them suitable to the client.

9. The method of claim 8, further including intercepting the function calls and references in the application programming interface call.

10. A non-transitory computer readable storage medium having stored thereon computer-executable instructions that, responsive to execution by a computing device, cause the computing device to perform operations comprising:

receiving a command from a client, the command related to a graphics rendering operation performed by the graphics application;

generating, in response to the command, an application programming interface call for producing rendered image data;

modifying one or more parameters of the application programming interface call based upon one or more differences between the client and a server in at least one of graphics processing capabilities and graphics contexts;

performing, with a rendering process, the rendering operation using the modified parameters;

transmitting, with a transmission process, the rendered image data to the client for display without rendering the image data on the client;

compressing the image data, wherein the rendering the image data for a first block occurs during a first time period, the compressing for a second block of data occurs during a second time period, and the transmitting the image data for a third block of data occurs during a third time period so that the rendering, the compressing, and the transmitting are pipelined;

discarding the first block of data if the rendering the image data for the first block of data is completed before the compressing for the second block of data, and discarding the second block of data if the compressing for the second block of data is completed before the transmitting the image of data for the third block of data.

11. The non-transitory computer readable storage medium of claim 10, wherein the application programming interface is an OPENGL application programming interface.

12. The non-transitory computer readable storage medium of claim 10, wherein modifying the one or more parameters of the application programming interface call comprises converting the at least one of the graphics processing capabilities and the graphics contexts appearing in the application programming interface call from the at least one of the graphics processing capabilities and the graphics contexts of the server to the at least one of the graphics processing capabilities and the graphics contexts of the client.

13. The non-transitory computer readable storage medium of claim 10, wherein modifying the application programming interface call further includes modifying function calls and references in the application programming interface call to make them suitable to the client.

14. The non-transitory computer readable storage medium of claim 13, further including intercepting the function calls and references in the application programming interface call.

* * * * *